US011769977B2

(12) United States Patent
Davis et al.

(10) Patent No.: US 11,769,977 B2
(45) Date of Patent: *Sep. 26, 2023

(54) WIRE FEEDING AND ATTACHING SYSTEM FOR CAMERA LENS SUSPENSIONS

(71) Applicant: Hutchinson Technology Incorporated, Hutchinson, MN (US)

(72) Inventors: Michael W. Davis, Rockford, MN (US); Bryan J. Scheele, Hutchinson, MN (US); Daniel W. Scheele, Hutchinson, MN (US); Andrew H. Ashwill, Glencoe, MN (US); Matthew D. Crane, Minneapolis, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 183 days.

This patent is subject to a terminal disclaimer.

(21) Appl. No.: 17/099,481

(22) Filed: Nov. 16, 2020

(65) Prior Publication Data
US 2021/0075176 A1 Mar. 11, 2021

Related U.S. Application Data

(63) Continuation of application No. 15/086,871, filed on Mar. 31, 2016, now Pat. No. 10,840,662.
(Continued)

(51) Int. Cl.
*H01R 43/052* (2006.01)
*B21F 45/00* (2006.01)
(Continued)

(52) U.S. Cl.
CPC ........... *H01R 43/052* (2013.01); *B21F 15/10* (2013.01); *B21F 23/00* (2013.01); *B21F 45/00* (2013.01);
(Continued)

(58) Field of Classification Search
CPC .......... B21F 15/10; B21F 23/00; B21F 45/00; F03G 7/065; G02B 27/646; G02B 7/08;
(Continued)

(56) References Cited

U.S. PATENT DOCUMENTS 3,587,432 A 6/1971 Koch
3,734,386 A 5/1973 Hazel
(Continued)

FOREIGN PATENT DOCUMENTS

JP 56-98900 A 8/1981
JP 2011-127585 A 6/2011
(Continued)

OTHER PUBLICATIONS

International Search Report and Written Opinion in International Application No. PCT/US2015/062576, dated Mar. 2, 2016.
(Continued)

*Primary Examiner* — Minh N Trinh
(74) *Attorney, Agent, or Firm* — DLA Piper LLP (US)

(57) ABSTRACT

A wire feeding and bonding tool and method for attaching wires to a component having first and second spaced-apart wire attach structures. Wire from a supply is fed through a capillary having at least a linear end portion with a feed opening. The capillary is positioned with respect to the component to locate a first portion of the wire extending from the feed opening adjacent to the first wire attach structure, and the wire is attached to the first attach structure. The capillary is moved with respect to the component along a wire feed path to feed the wire from the first wire attach structure to the second wire attach structure and to locate a second portion of the wire extending from the feed opening adjacent to the second attach structure. The wire is attached to the second wire attach structure, and cut from the supply.

20 Claims, 21 Drawing Sheets

Related U.S. Application Data

(60) Provisional application No. 62/142,182, filed on Apr. 2, 2015.

(51) Int. Cl.
*B21F 23/00* (2006.01)
*B21F 15/10* (2006.01)
*H04N 23/68* (2023.01)
G02B 7/08 (2021.01)
G02B 27/64 (2006.01)
F03G 7/06 (2006.01)

(52) U.S. Cl.
CPC ........... *H04N 23/687* (2023.01); *F03G 7/065* (2013.01); *G02B 7/08* (2013.01); *G02B 27/646* (2013.01); *G03B 2205/0076* (2013.01)

(58) Field of Classification Search
CPC ........ G03B 2205/0076; H04N 5/23287; H01R 43/052
See application file for complete search history.

(56) References Cited

U.S. PATENT DOCUMENTS

| | | | |
|---|---|---|---|
| 3,776,447 A | 12/1973 | Adams et al. | |
| 4,140,265 A | 2/1979 | Morino | |
| 4,437,603 A | 3/1984 | Kobayashi et al. | |
| 4,586,642 A | 5/1986 | Dreibelbis et al. | |
| 4,781,319 A | 11/1988 | Deubzer et al. | |
| 4,824,005 A | 4/1989 | Smith, Jr. | |
| 5,402,927 A | 4/1995 | Frasch | |
| 5,477,463 A | 12/1995 | Tamura | |
| 6,279,215 B1 | 8/2001 | Nomoto | |
| 7,384,531 B1 | 6/2008 | Peltoma et al. | |
| 7,388,733 B2 | 6/2008 | Swanson et al. | |
| 7,679,647 B2 | 3/2010 | Stavely et al. | |
| 7,686,204 B2 * | 3/2010 | Takahashi | H01L 24/78 228/103 |
| 7,748,599 B2 | 7/2010 | Arahata et al. | |
| 7,929,252 B1 | 4/2011 | Hentges et al. | |
| 8,144,430 B2 | 3/2012 | Hentges et al. | |
| 8,169,746 B1 | 5/2012 | Rice et al. | |
| 8,218,958 B2 | 7/2012 | Sato | |
| 8,286,332 B2 | 10/2012 | Lang et al. | |
| 8,350,959 B2 | 1/2013 | Topliss et al. | |
| 8,570,384 B2 | 10/2013 | Brown | |
| 8,646,675 B2 | 2/2014 | Lang | |
| 8,848,064 B2 | 9/2014 | Topliss et al. | |
| 8,885,299 B1 | 11/2014 | Bennin et al. | |
| 9,457,421 B2 | 10/2016 | Sekine et al. | |
| 10,840,662 B2 * | 11/2020 | Davis | B21F 15/10 |
| 2002/0053920 A1 | 5/2002 | Ming-Hsun et al. | |
| 2008/0231955 A1 | 9/2008 | Otsuka | |
| 2012/0154614 A1 | 6/2012 | Moriya et al. | |
| 2012/0174574 A1 | 7/2012 | Kotanagi et al. | |
| 2013/0221071 A1 | 8/2013 | Kim et al. | |
| 2013/0222685 A1 | 8/2013 | Topliss et al. | |
| 2013/0292856 A1 | 11/2013 | Braun et al. | |
| 2013/0300880 A1 | 11/2013 | Brown et al. | |
| 2015/0304561 A1 | 10/2015 | Howarth et al. | |
| 2015/0365568 A1 | 12/2015 | Topliss et al. | |
| 2021/0075175 A1 | 3/2021 | Davis et al. | |
| 2021/0075176 A1 * | 3/2021 | Davis | B21F 23/00 |

FOREIGN PATENT DOCUMENTS

| | | |
|---|---|---|
| WO | WO 2013/153400 A2 | 10/2013 |
| WO | WO 2013/175197 A1 | 11/2013 |
| WO | WO 2014/076463 A1 | 5/2014 |
| WO | WO 2014/083318 A1 | 6/2014 |
| WO | WO 2015/132571 A1 | 9/2015 |
| WO | WO 2016/009200 A1 | 1/2016 |

OTHER PUBLICATIONS

International Search Report and Written Opinion in International Application No. PCT/US2015/062713, dated Mar. 2, 2016.
International Search Report and Written Opinion in International Application No. PCT/US2015/063363, dated Feb. 12, 2016.
International Search Report and Written Opinion in International Application No. PCT/US2016/021230, dated Jun. 3, 2016.
International Search Report and Written Opinion in International Application No. PCT/US2016/025194, dated Jun. 30, 2016.
International Preliminary Report on Patentability in International Application No. PCT/US2016/025194, dated Oct. 12, 2017.
Extended European Search Report in European Application No. 16774169.3, dated Oct. 12, 2018.
EP Communication pursuant to Article 94(3) in Application No. 16774169.3, dated Oct. 14, 2020.
Office Action in Chinese Application No. 201680024732,1, dated Jan. 2, 2020.
Notice of Reasons for Refusal in Japanese Application No. 2017-551683, dated Aug. 27, 2019.
Office Action for U.S. Appl. No. 15/086,871, dated Dec. 17, 2018.
Office Action for U.S. Appl. No. 15/086,871, dated Jun. 12, 2019.
Office Action for U.S. Appl. No. 15/086,871, dated Nov. 8, 2019.
Office Action for U.S. Appl. No. 15/086,871, dated Feb. 28, 2020.
Notice of Allowance for U.S. Appl. No. 15/086,871, dated Jul. 8, 2020.
Notice of Preliminary Rejection in Korean Application No. 10-2017-7031353, dated May 20, 2022.
Office Action for U.S. Appl. No. 17/099,373, dated Sep. 15, 2022.
Notice of Allowance in Korean Application No. 10-2017-7031353, dated Jan. 9, 2023.
Notice of Allowance for U.S. Appl. No. 17/099,373, dated Feb. 8, 2023.

* cited by examiner

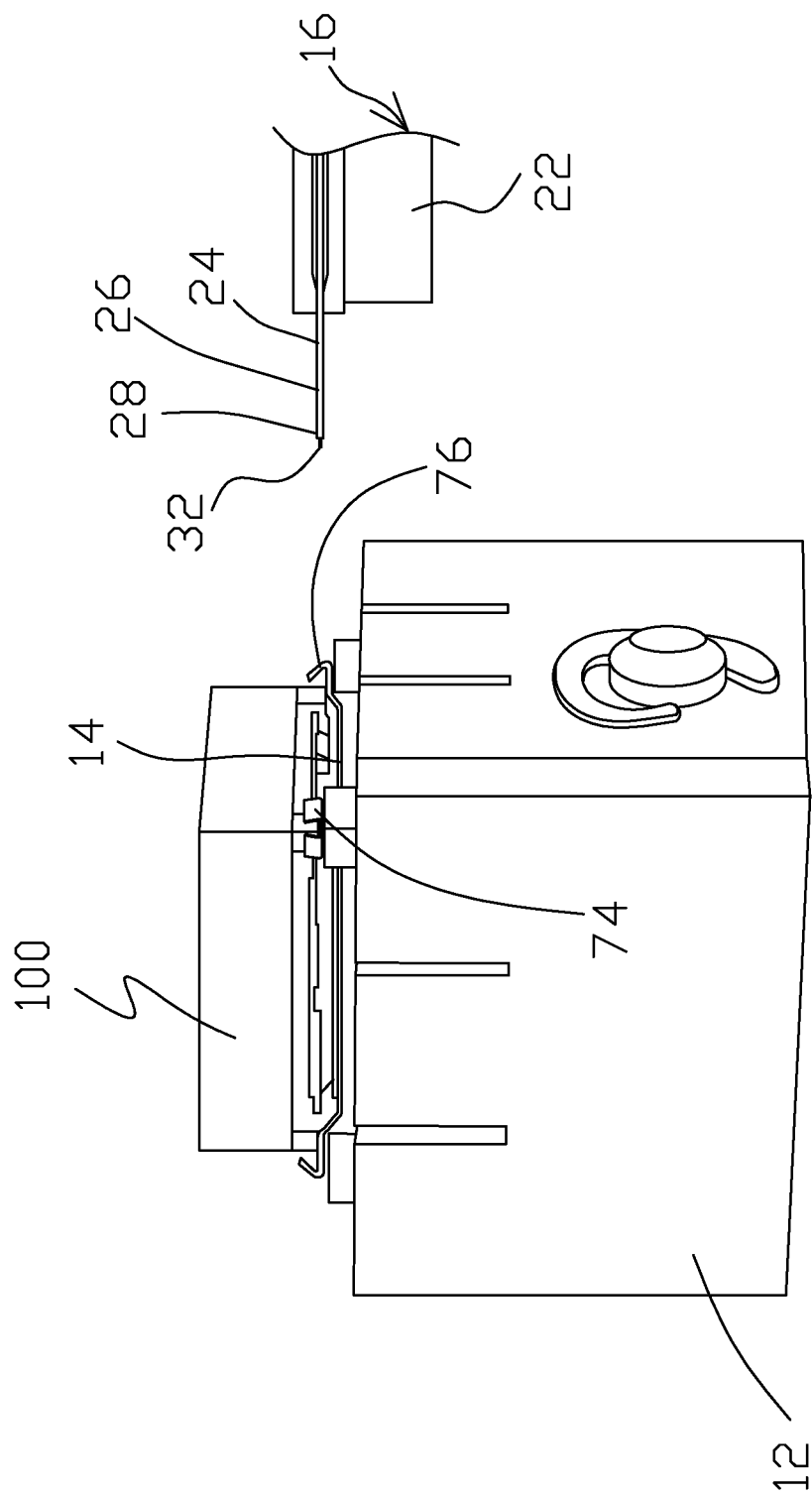

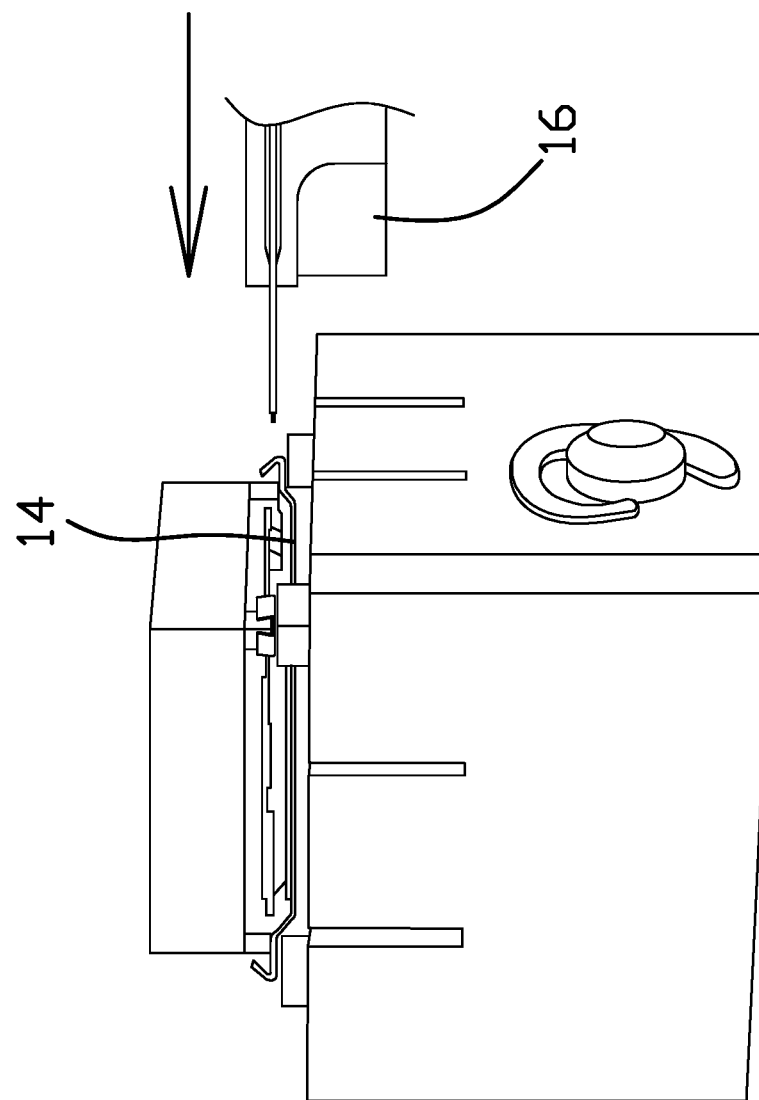

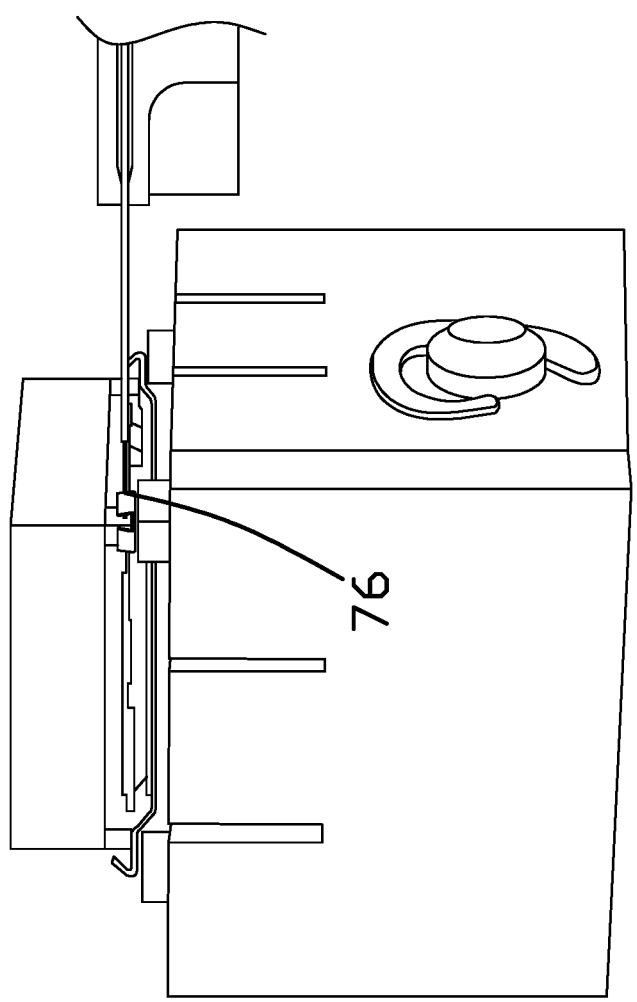

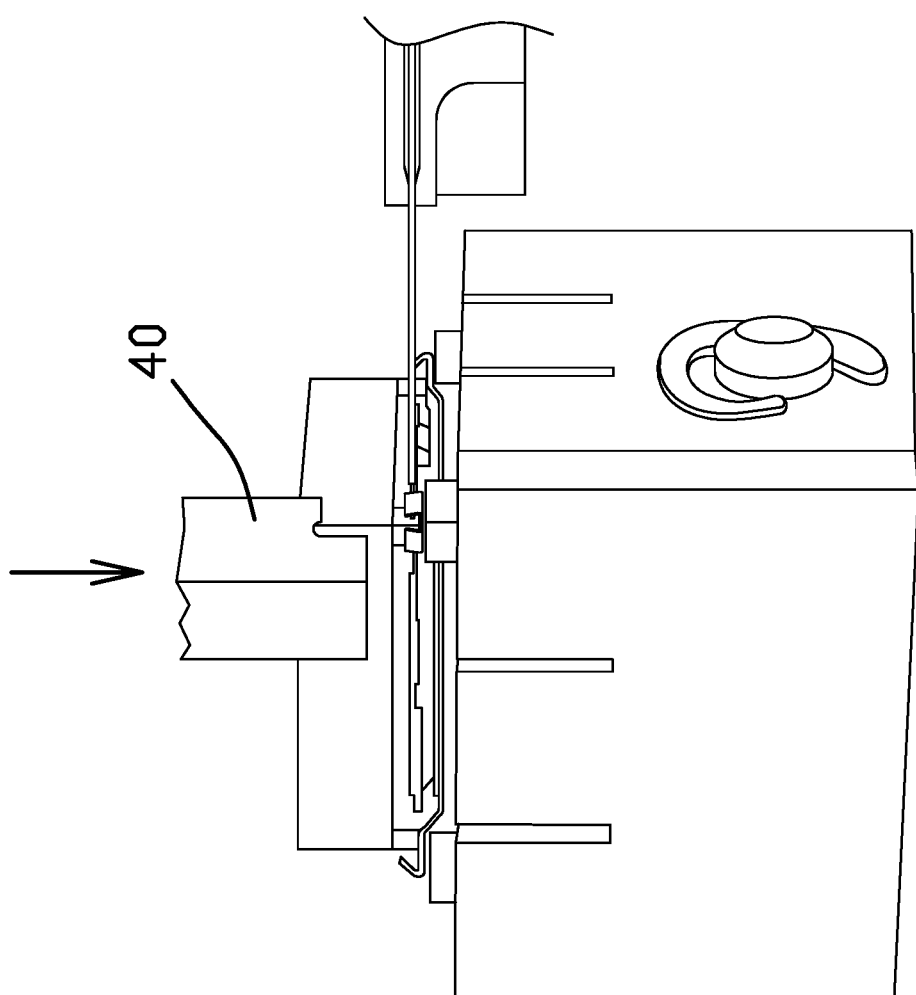

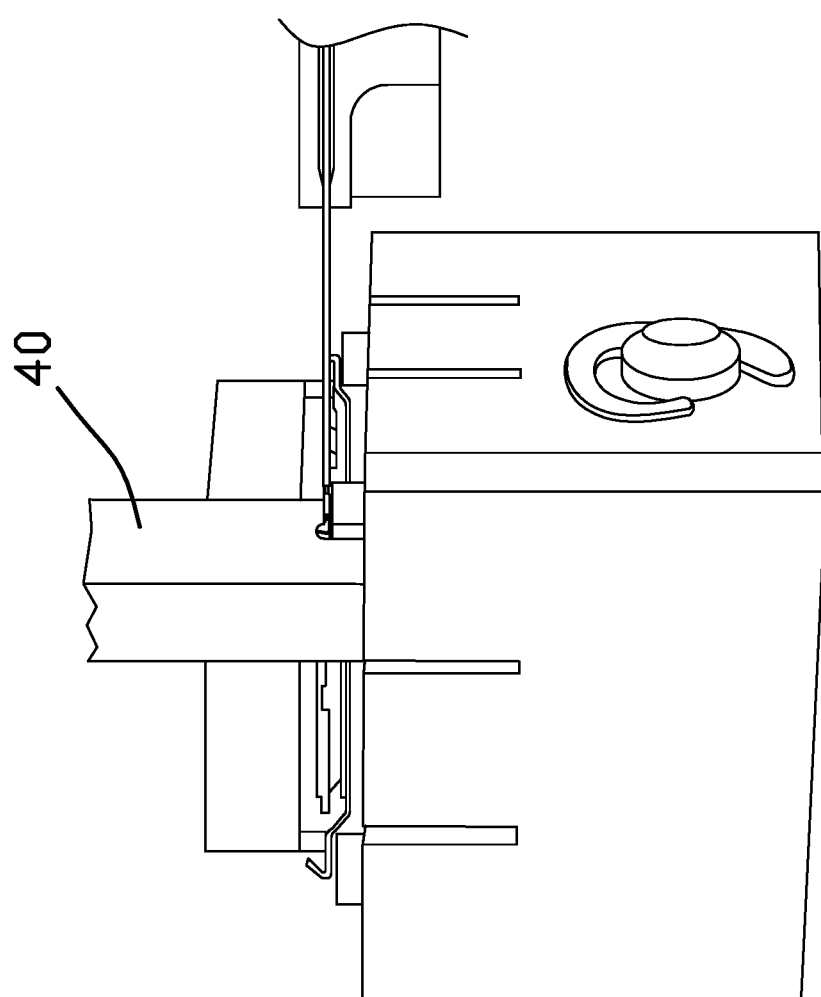

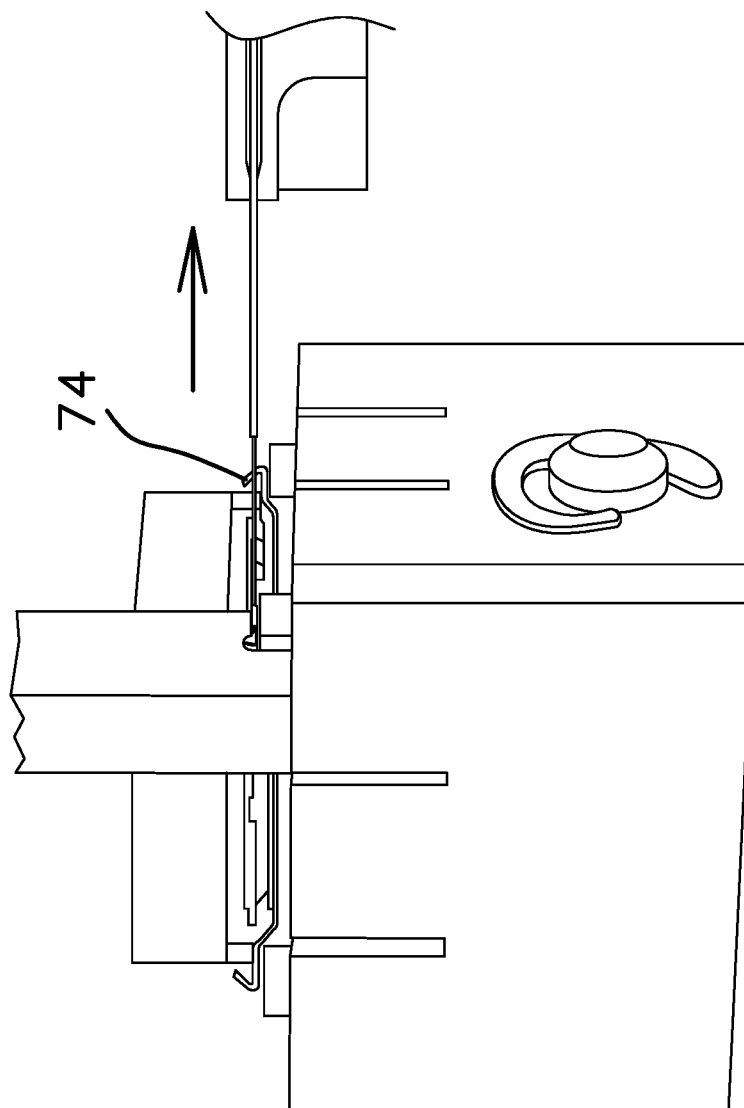

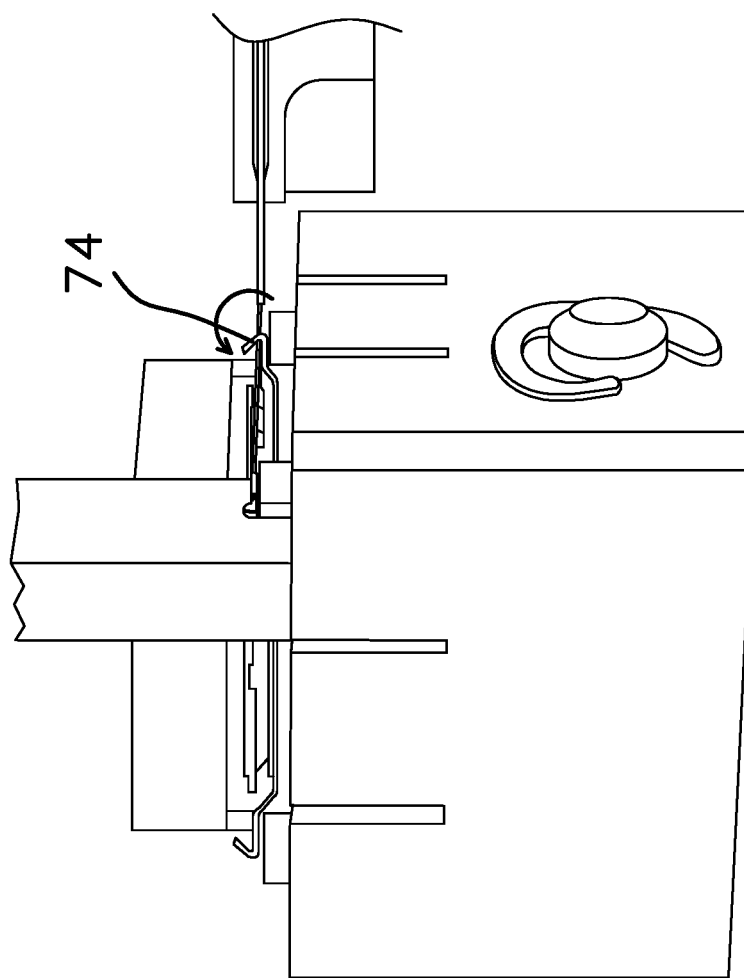

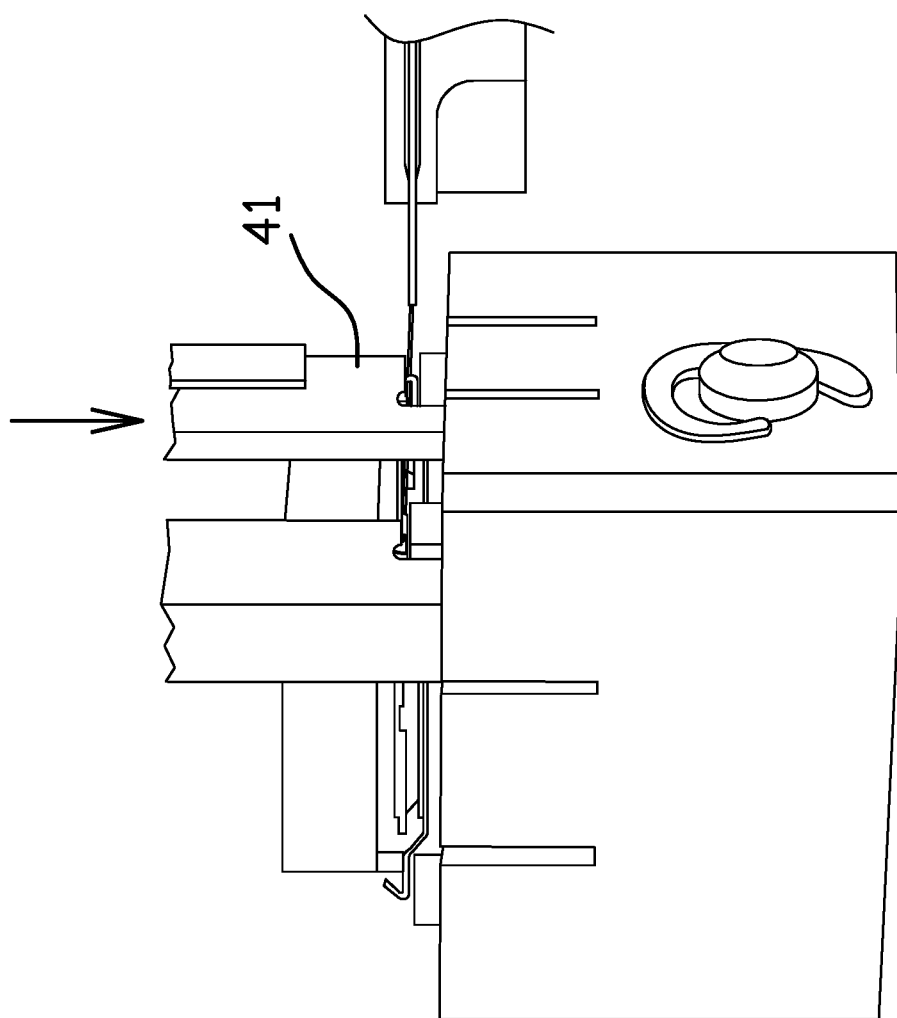

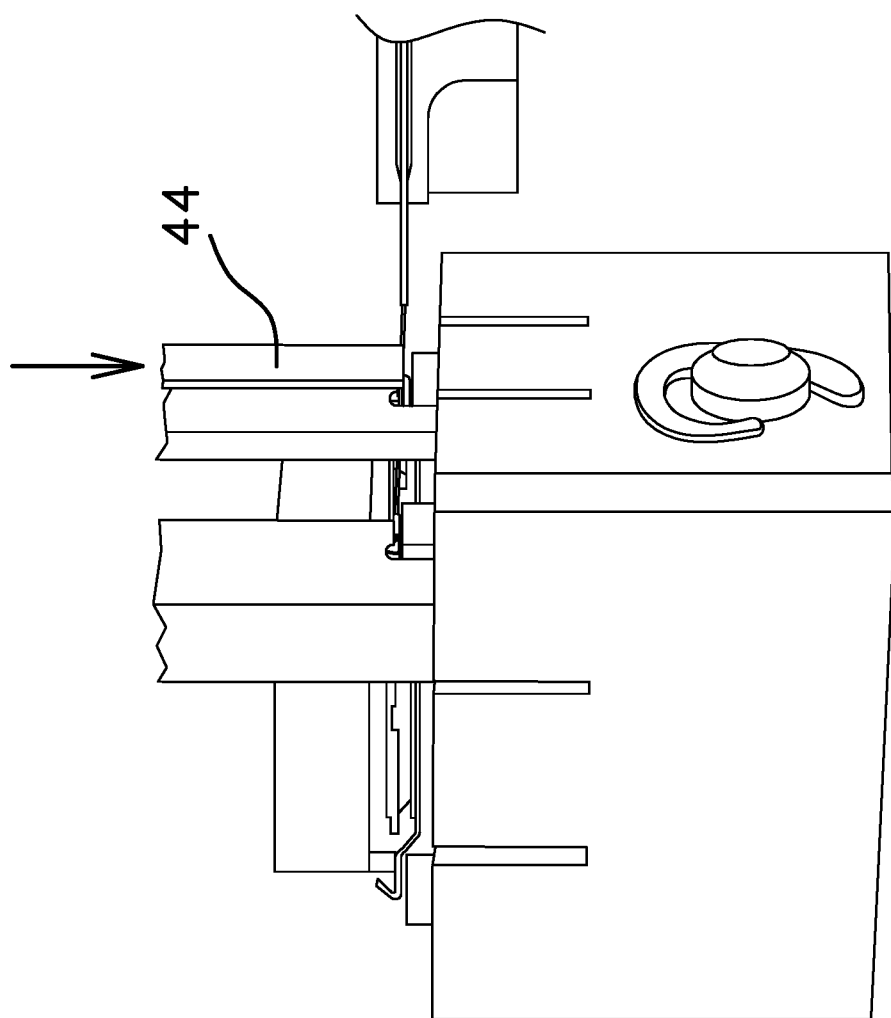

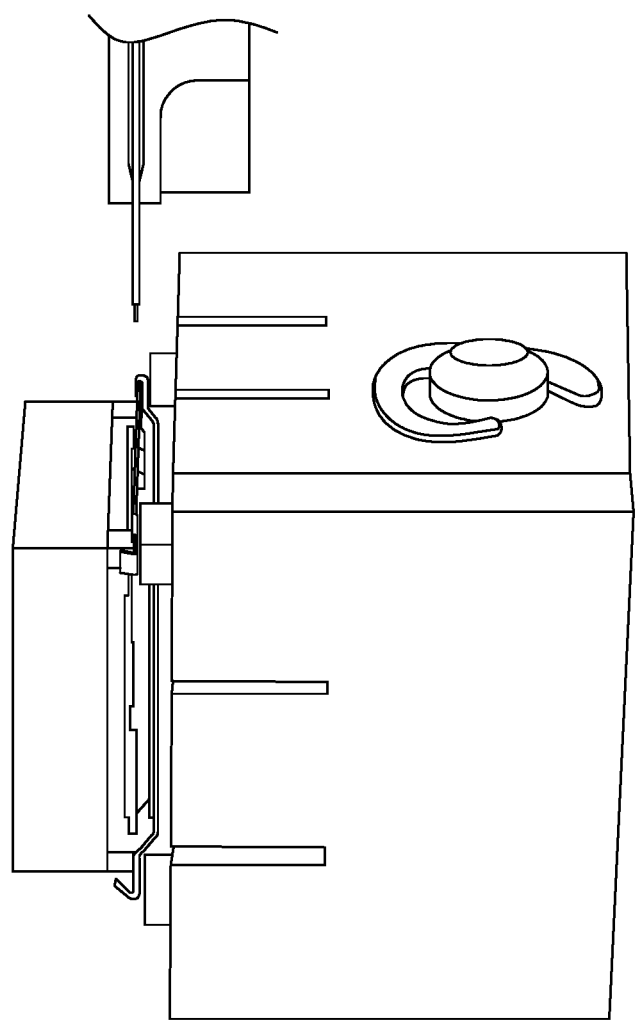

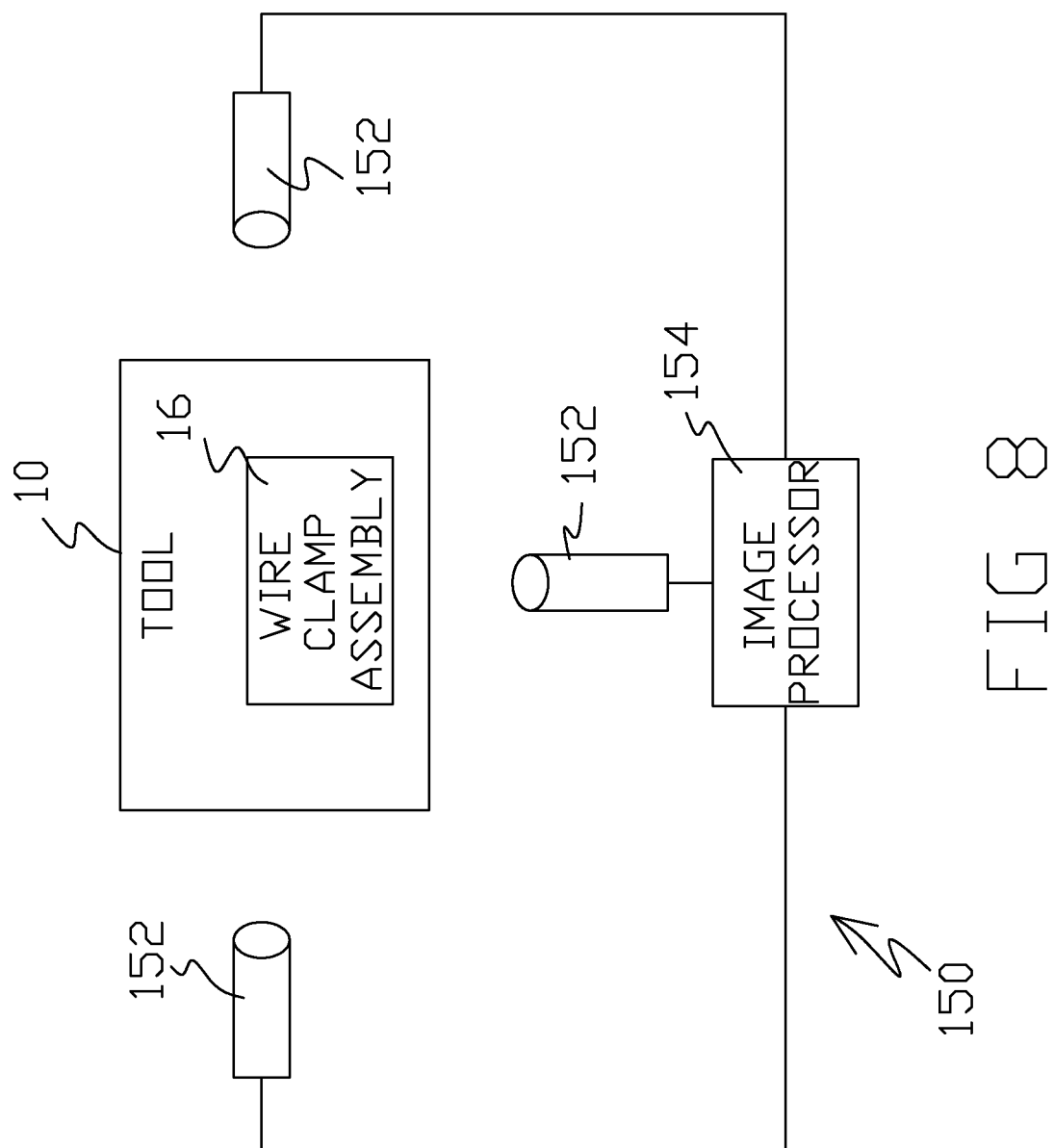

2

WIRE FEEDING AND ATTACHING SYSTEM FOR CAMERA LENS SUSPENSIONS

CROSS REFERENCE TO RELATED APPLICATION

This application is a Continuation of U.S. patent application Ser. No. 15/086,871 filed on Mar. 31, 2016, now U.S. Pat. No. 10,840,662, which claims the benefit of U.S. Provisional Application No. 62/142,182 filed on Apr. 2, 2015 and entitled Wire Feeding and Attaching System for Camera Lens Suspensions, each of which is incorporated herein by reference in its entirety and for all purposes.

FIELD OF THE INVENTION

The invention relates generally to wire bonding systems used to manufacture precision components. One embodiment of the invention is a wire feeding and attaching system used in the manufacture of camera lens suspensions such as those incorporated into mobile phones.

BACKGROUND

Small-scale, precision and other components sometimes include wires that are attached or bonded to portions of those components. Manufacturing tooling or systems, sometimes known as wire bond systems, can be used to attach the wires to the components.

By way of example, PCT International Application Publication No. WO 2014/083318 discloses a camera lens optical image stabilization (OIS) suspension system that has a moving assembly coupled to a stationary support assembly by four shape memory alloy (SMA) actuator wires. Each SMA actuator wire has one end attached to a crimp on the support assembly, and an opposite end attached to a crimp on the moving assembly. In view of factors such as the relatively small scale of the OIS suspension system, the precision by which the actuator wires need to be attached, and the relatively fragile or sensitive nature of wires, it can be difficult to efficiently manufacture suspension systems of these types.

There remains a continuing need for improved systems and method for manufacturing products having attached wires. In particular, there is a need for such systems and methods that are capable of accurately and reliably attaching wires in precision components. Systems and methods having these capabilities that enable efficient and high-volume manufacturing would be especially desirable.

SUMMARY

Embodiments of the invention include a wire feeding and bonding tool and method capable of accurately and reliably attaching wires to precision components of the type having first and second spaced-apart wire attach structures. An embodiment of the method includes feeding the wire through a capillary having an end portion with a feed opening and positioning the capillary to locate a first portion of the wire extending from the feed opening adjacent to the first wire attach structure. The first portion of the wire is attached to the first wire attach structure. The capillary is moved with respect to the component along a wire feed path to feed the wire from the first wire attach structure to the second wire attach structure and to position the capillary to locate a second portion of the wire extending from the feed opening adjacent to the second wire attach structure. The second portion of the wire is attached to the second wire attach structure. The wire can be cut from a supply after it is attached to the second wire attach structure.

In embodiments, the component wire attach structures can be crimps, and the wire can be attached by deforming the crimps. Other embodiments of the method include clamping and releasing the wire with respect to the capillary. Yet other embodiments of the method include tensioning the wire. In still other embodiments, the capillary has a linear end portion, and the capillary is moved while maintaining the linear end portion sufficiently coaxial with a wire axis extending between the first and second attach structures to reduce damage to the wire.

BRIEF DESCRIPTION OF THE DRAWINGS

FIG. 8 is a diagrammatic illustration of a capillary inspection system in accordance with embodiments of the invention.

DETAILED DESCRIPTION OF THE INVENTION

Figure 1:
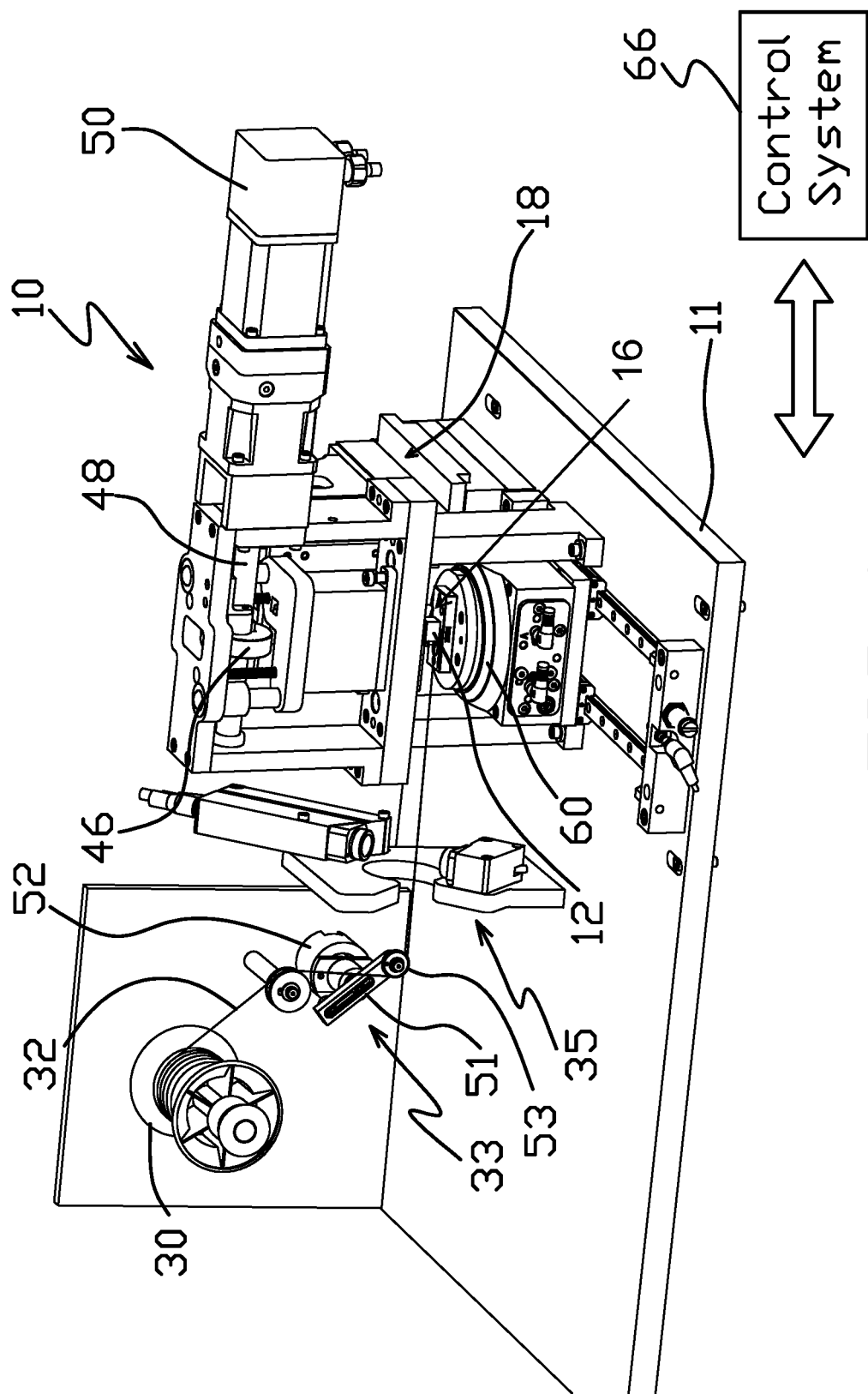
FIG. 1 is an illustration of a wire bonding tool in accordance with embodiments of the invention.
Figure 2:
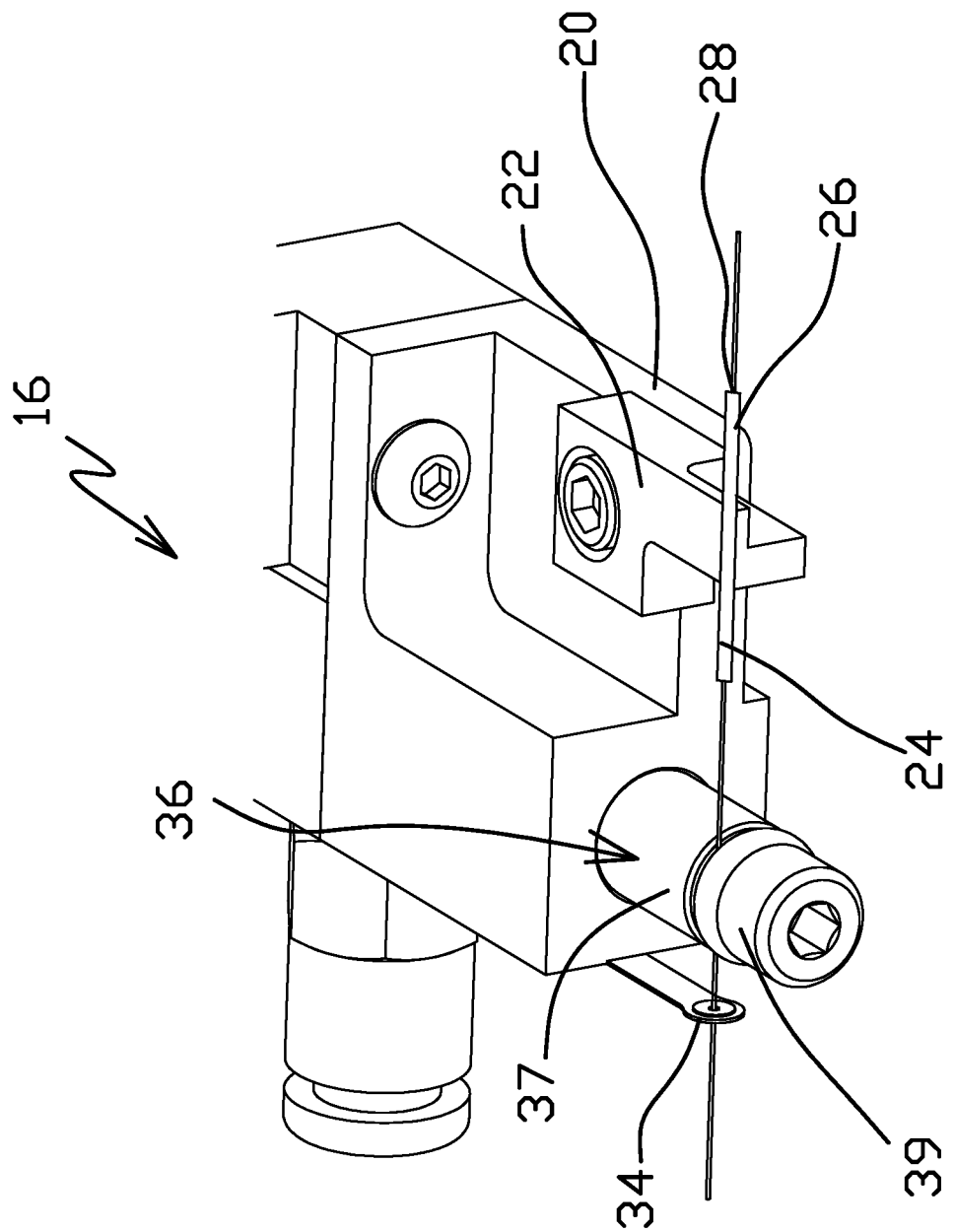
FIG. 2 is a detailed illustration of the wire clamp assembly of the tool shown in FIG. 1
Figure 3:
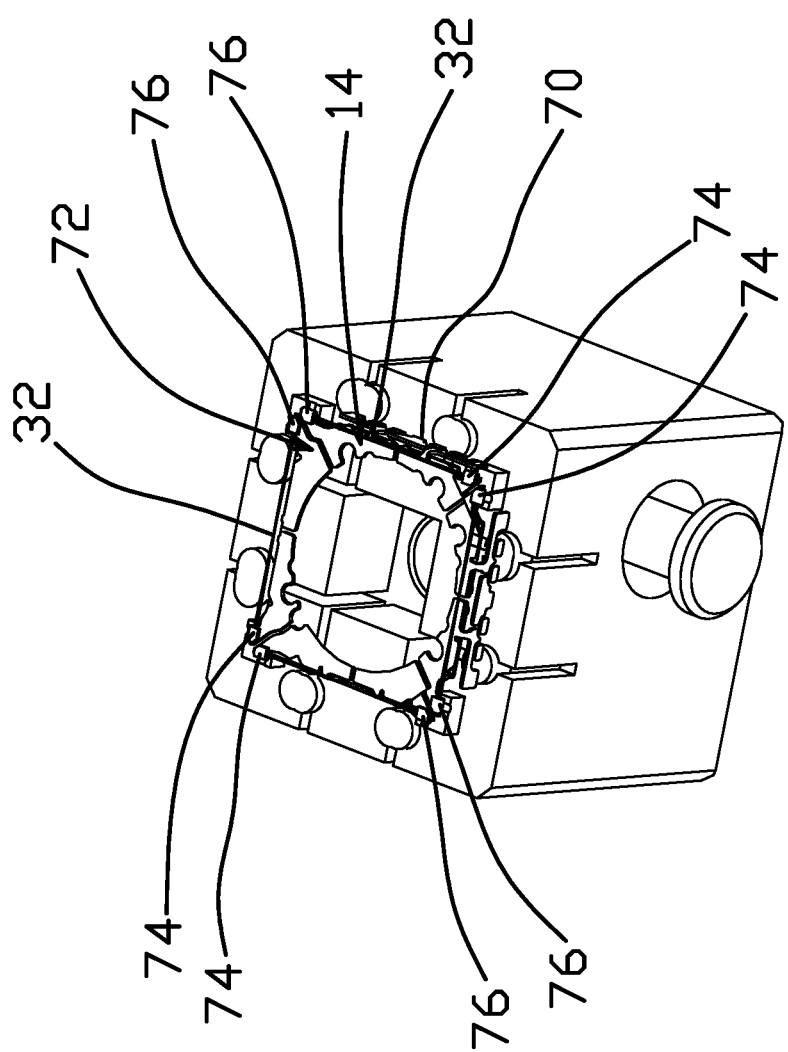
FIG. 3 is a detailed top side illustration of the pedestal shown in FIG. 1 with a component to which wires are to be attached claimed thereto.

A wire feeding and bonding tool 10 in accordance with embodiments of the invention can be described generally with reference to FIGS. 1-3. As shown, tool 10 includes a base 11 and a support such as pedestal 12 for holding a component 14 (e.g., a camera lens optical image stabilization (OIS) assembly), to which one or more wires are to be bonded by the tool. A wire clamp assembly 16 is mounted to and driven with respect to the base 11 by an actuator such as stage 18. The wire clamp assembly 16 includes a base 20, and a clamp 22 for holding a capillary 24. The capillary 24 is a tubular structure that has an end portion 26 with a feed opening 28 at its distal end. In embodiments, including the embodiment shown in FIG. 2, the end portion 26 is linear. In other embodiments the end portion 26 is nonlinear (e.g., it can be curved). In the illustrated embodiment, the entire length of the capillary 24 is linear. The wire clamp assembly 16 also includes a ruby wire guide 34 and a wire clamp 36. Wire 32 to be attached to the component 14 is supplied from a supply 30 such as a spool. In embodiments, the supply 30 is driven by a motor (not shown in FIG. 1). From the supply 30, the wire 32 extends through a tensioning mechanism 33 and by an optical micrometer 35 to the wire clamp assembly 16. On the wire clamp assembly 16, the wire extends through the ruby wire guide 34 and clamp 36 before entering the proximal end of the capillary 24. The wire 32 extends through the capillary 24 and out the feed opening 28. Stage 18 moves the wire clamp assembly 16 with respect to the pedestal 12 about one or more axes to position the capillary and the wire 32 extending from the feed opening 28 with respect to structures on the component 14 to which the wire is to be bonded. In embodiments, stage 18 moves the capillary about x, y, z and θ axes (i.e., four degrees of freedom). The capillary clamp 22 allows the capillary 24 to be conveniently changed out in the event it is damaged. Wire clamp 36 includes a base member 37 and a moving member 39. An actuator (such as a solenoid, not shown) drives the moving member 39 with respect to the base member 37 between a release position that allows the wire 32 to be fed to the capillary 24, and a clamp position inhibiting movement of the wire with respect to the capillary.

Figure 4:
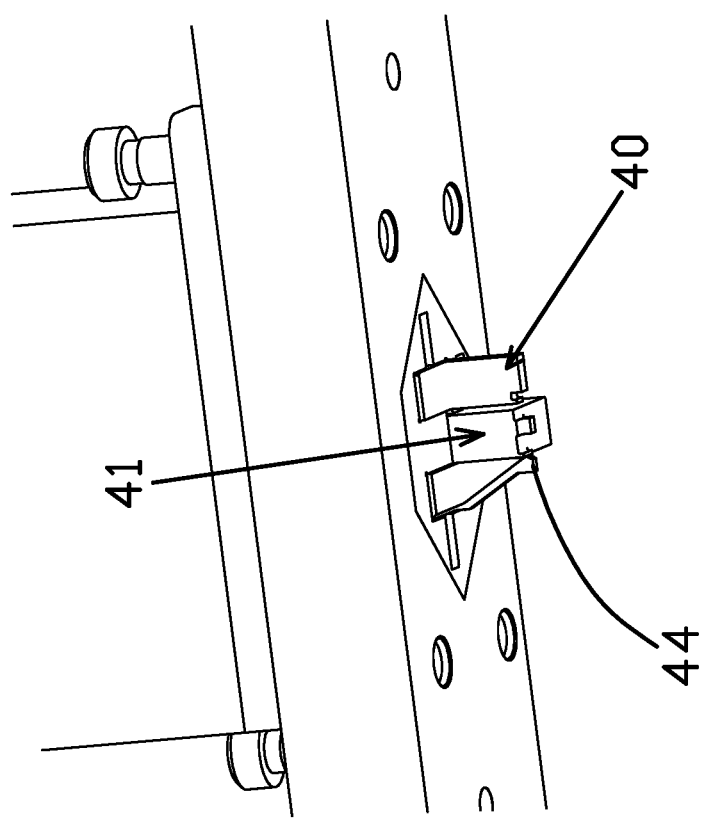
FIG. 4 is a detailed illustration of crimping punches and a cutting tool of the wire bonding tool shown in FIG. 1.

Tool 10 also includes one or more attachment tools positioned with respect to the pedestal 12 for attaching the wire 32 to the component 14. In embodiments described in greater detail below, tool 10 is used to attach wire 32 to components 14 that have deformable crimp attach structures. Accordingly, and as shown in FIG. 4, embodiments of the invention include first and second crimping punches 40 and 41 that are actuated to deform the crimp attach structures so those structures engage the wire 32. Other embodiments of the invention (not shown) include other types of attachment tools, such as, e.g., soldering, welding and conductive adhesive dispensing tools for attaching the wires to the attach structures such as bonding areas on the component. Tool 10 also includes a cutting tool 44, such as a punch with a sharp edge (also shown in FIG. 4), positioned with respect to the pedestal 12 to cut the wire 32 (e.g., at a location between the feed opening 28 and the wire attach structures on the component 14). As shown in FIG. 1, in the illustrated embodiment of tool 10, the first and second crimping punches 40 and 41 and the cutting tool 44 are reciprocally driven or actuated by cams 46 mounted to a shaft 48 that is driven by a motor 50. In the illustrated embodiment, the pedestal 12 is mounted to an actuator 60 that moves the pedestal with respect to the base 11. In embodiments, the actuator 60 is a rotary index table to rotate the pedestal 12. In other embodiments (not shown) the actuator 60 can take other forms.

Figure 7:
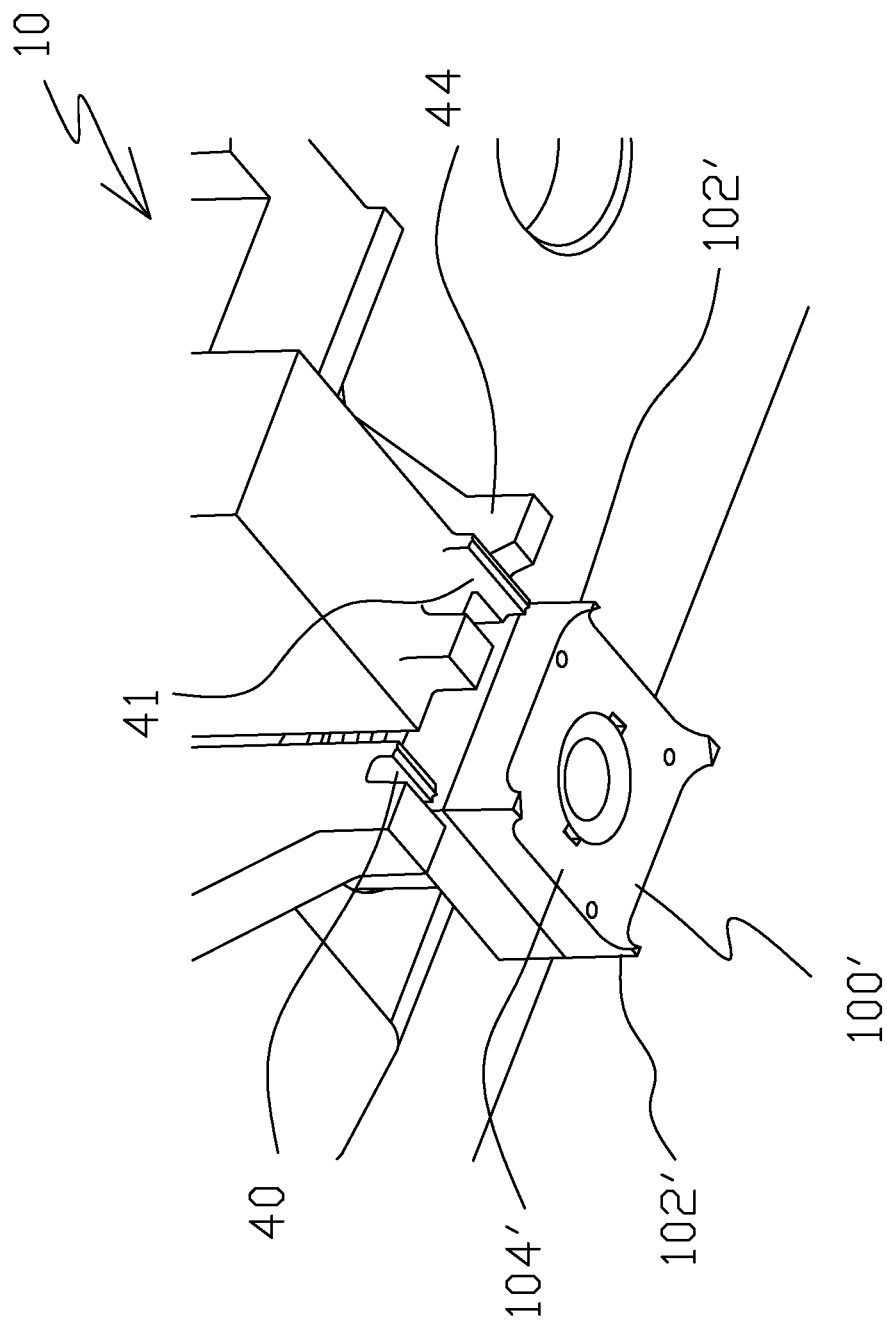
FIG. 7 is an illustration of a part clamp in accordance with embodiments of the invention.

As shown in FIG. 7, embodiments of tool 10 also include a part clamp 100' that is incorporated into a die set with the crimping punches 40, 41 and the cutting tool 44. In the illustrated embodiment, the clamp 100' has four clamp pads 102' that extend from a base 104'. Clamp pads 102' are configured and positioned to engage a component 14 positioned on the pedestal 12. The part clamp 100' is reciprocally driven or actuated by the cams 46 in embodiments.

A control system 66 illustrated generally in FIG. 1 is coupled to the stage 18, wire supply motor, micrometer 35, wire clamp actuator, motor 50 and actuator 60. The control system 66 is a programmed controller in embodiments. As described in greater detail below, during operation of the tool 10, the control system 66: (1) actuates the stage 18 to position the capillary 24 with respect to portions of the wire 32 extending from the feed opening 28 presented at the wire attach structures on the component 14, (2) actuates the stage 18 to move the capillary 24 along a wire feed path between the attach structures on the component 14, (3) actuates the motor 50 to drive the punches 40 and 41, (4) actuates the motor 50 to drive the cutting tool 44, (5) actuates the wire supply motor to pay out or feed wire from the supply 30, and (6) actuate the wire clamp 36 to clamp the wire 32 with respect to the clamp assembly 16 (and therefore with respect to the capillary 24), and (7) actuates the motor 50 to drive the part clamp 100' in embodiments.

In embodiments, the micrometer 35 provides information to the control system 66 regarding wire 32 fed past the micrometer, and the control system can use that information for active adjustment and control of the wire feed operations. For example, some embodiments of the invention can be used with coated wire having spaced-apart uncoated regions at locations where the wire is to be attached to the component 14. In such embodiments the micrometer 35 can be used to provide information representative of the locations of the uncoated wire regions. Other embodiments include other types of micrometers or other structures for providing information representative of the wire 32 fed from the supply 30. In embodiments, the wire supply motor can be a stepper motor with an encoder to provide information representative of the amount of actuation of the motor or supply 30 to the control system 66.

The tensioning mechanism 33 can include a weighted pendulum or dancer arm 51 and a rotary position sensor 52. Position sensor 52 is coupled to the control system 66 and provides information representative of the position of the dancer arm 51. A wire guide 53 is mounted to the end of the dancer arm 51 by a rotary bearing. As shown for example in FIG. 1, the wire 32 is routed between the supply 30 and the clamp assembly 16 by the wire guide 53, and the dancer arm 51 and wire guide are displaced off of the bottom dead center with respect to the rotational axis of the position sensor 52. The weight of the dancer arm 51 and wire guide 53 provides tension on the wire 32. The rotary position sensor 52 provides information to the control system 66 relating to the position of the dancer arm 51, enabling the control system to maintain the dancer arm at positions to provide desired amounts of tension on the wire 32 (e.g., maintaining the dancer arm position generally constant will provide a constant tension on the wire).

In embodiments, tool 10 is configured to attach shape memory alloy (e.g., nitinol) wire 32 to a component 14 in the form of an actuator of a camera lens optical image stabilization (OIS) system such as that described generally in PCT International Application Publication No. WO 2014/083318. As shown for example in FIG. 3, the actuator component 14 is a four-sided and generally square-shaped member having a first or stationary member 70 and a second or moving member 72. Each side of the component 14 includes a first wire attach structure in the form of a crimp 74 on the stationary member 70, and a second wire attach structure in the form of a crimp 76 on the moving member 72. Tool 10 attaches a section of wire 32 between the crimps 74 and 76 on each side of the component 14.

Figure 5:
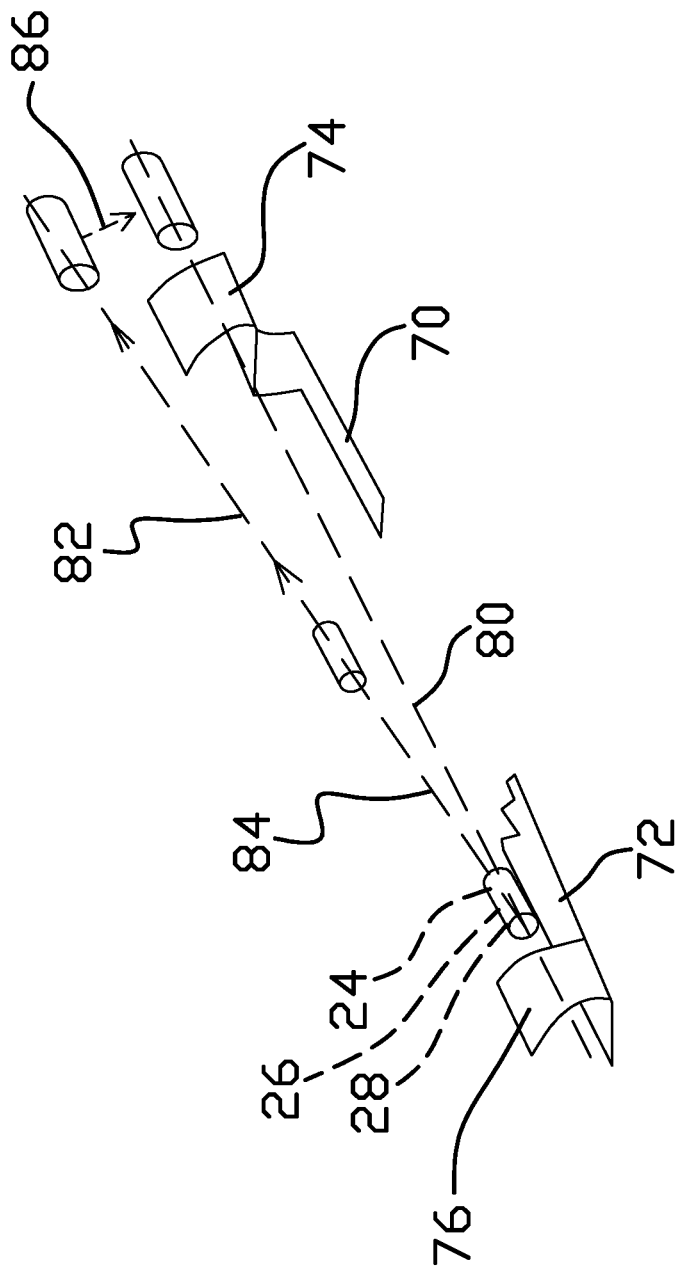
FIG. 5 is a diagrammatic illustration of portions of a component that can have wires bonded thereto by the tool of FIG. 1, and a wire feed path used by the tool.

FIG. 5 is a diagrammatic illustration of portions of the stationary member 70 and crimp 74, and moving member 72 and crimp 76, on one side of the component 14. A wire axis 80 corresponding to the location of a section of wire 32 extending between and attached to the component 14 by the crimps 74 and 76 is illustrated. As described in greater detail below, during the attach process an end of the wire 32 (not shown in FIG. 5) extending from the feed opening 28 of the capillary 24 is presented and attached to a first attach structure such as crimp 76. The capillary 24 is then driven along a feed path 82 to feed the wire from crimp 76 to the second wire attach structure such as crimp 74. During this wire feed operation, the end portion 26 of the capillary 24 is maintained in an orientation that causes the wire 32 to emerge from the feed opening 28 sufficiently coaxial with the wire axis 80 to prevent, minimize or at least reduce the opportunity for damage to the wire 32. In the illustrated embodiment, for example, the linear end portion 26 of the capillary 24 (and the entire length of the capillary if it is linear) is maintained in an orientation that is sufficiently coaxial with the wire axis 80 to prevent, minimize or at least reduce the opportunity for damage to the wire 32. In embodiments (not illustrated in FIG. 5), the wire feed path can be coaxial with the wire axis 80. In other embodiments such as that illustrated in FIG. 5, the wire feed path 82 has at least portions that are not coaxial with the wire path 80. As shown, wire feed path 82 includes a first section 84 that feeds the wire 32 from the crimp 76 to a position opposite the crimp 74 from the crimp 76 and with the wire outside of the crimp 74, and a second section 86 that moves the wire into the crimp 74. First path section 84 is at an angle and direction with respect to the wire axis 80 to provide clearance between the capillary 24 (and optionally other components of the tool 10) and the crimp 74. In embodiments, the angle between the first section 84 of the feed path 82 and the wire path 80 is relatively small to prevent, minimize or at least reduce damage to the wire 32 during the feeding process. The second section 86 of the wire feed path 82 is relatively short with respect to the length of the first path section 84, and moves the wire 32 into the crimp 74 so it can be engaged by deformation of the crimp. In the illustrated embodiment, first path section 84 is linear, and second path section 86 is generally linear and perpendicular to the first path section. In the illustrated embodiment, the end portion 26 of the capillary 24 is oriented generally parallel to the wire axis 80 as the capillary is moved along the wire feed path 82. In other embodiments, the distal end portion 26 is oriented generally parallel to the first path section 84 as the capillary is driven along the first path section. Still other embodiments include other wire feed paths and orientations of the distal end portion 26 of the capillary 24, with the objective of preventing, minimizing or at least reducing damage to the wire 32 during the operation of tool 10. For example, in other embodiments (e.g., as illustrated in FIG. 6g), the second path section 86 is a looping path from a location outside of the crimp 74, over the top of the open crimp, and into the open crimp.

Figure 6J:
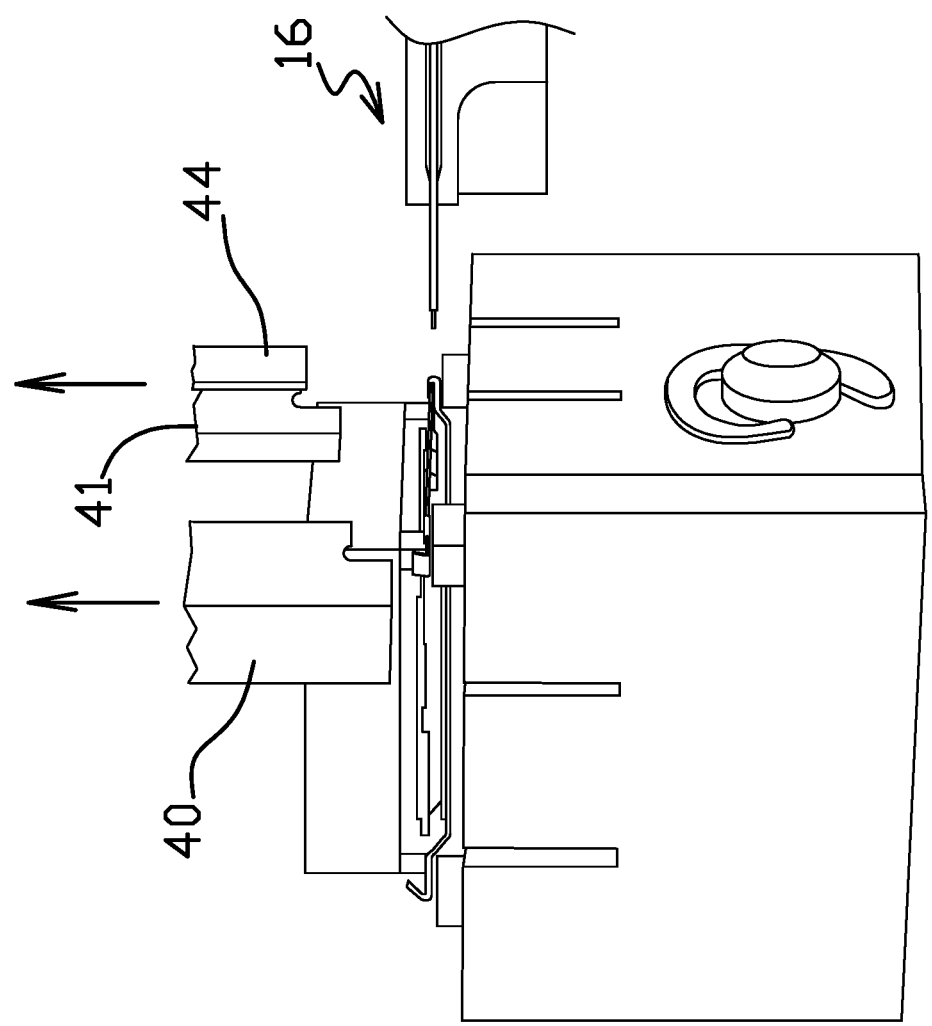
FIGS. 6a-6n are diagrammatic illustrations of portions of the tool shown in FIG. 1, illustrating a sequence of operations performed by the tool to bond wires to a component.
Figure 6L:
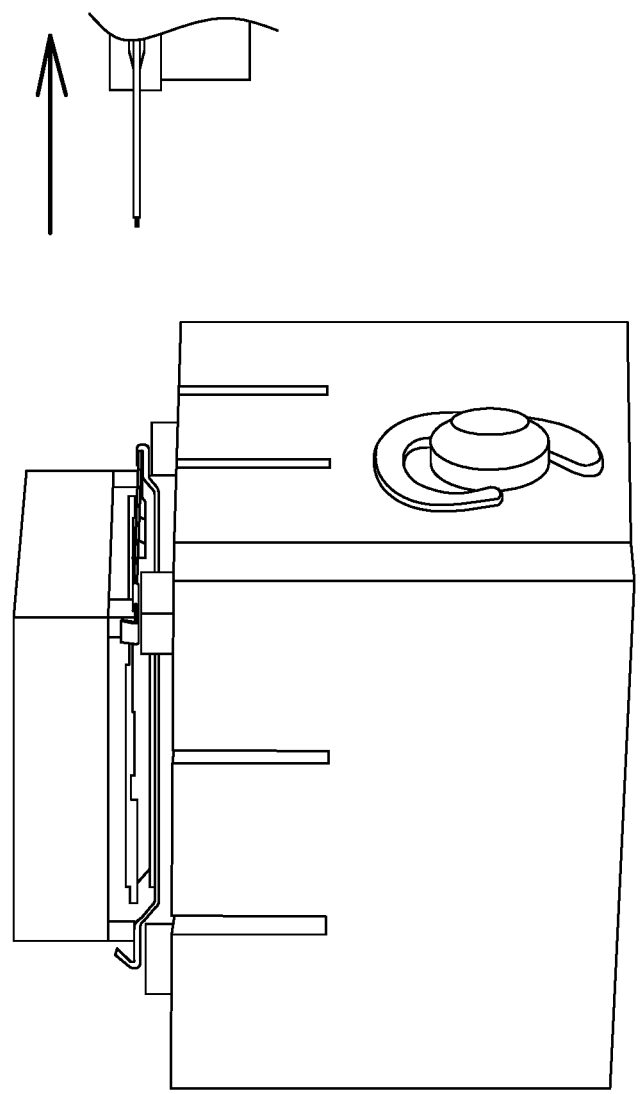
Figure 6M:
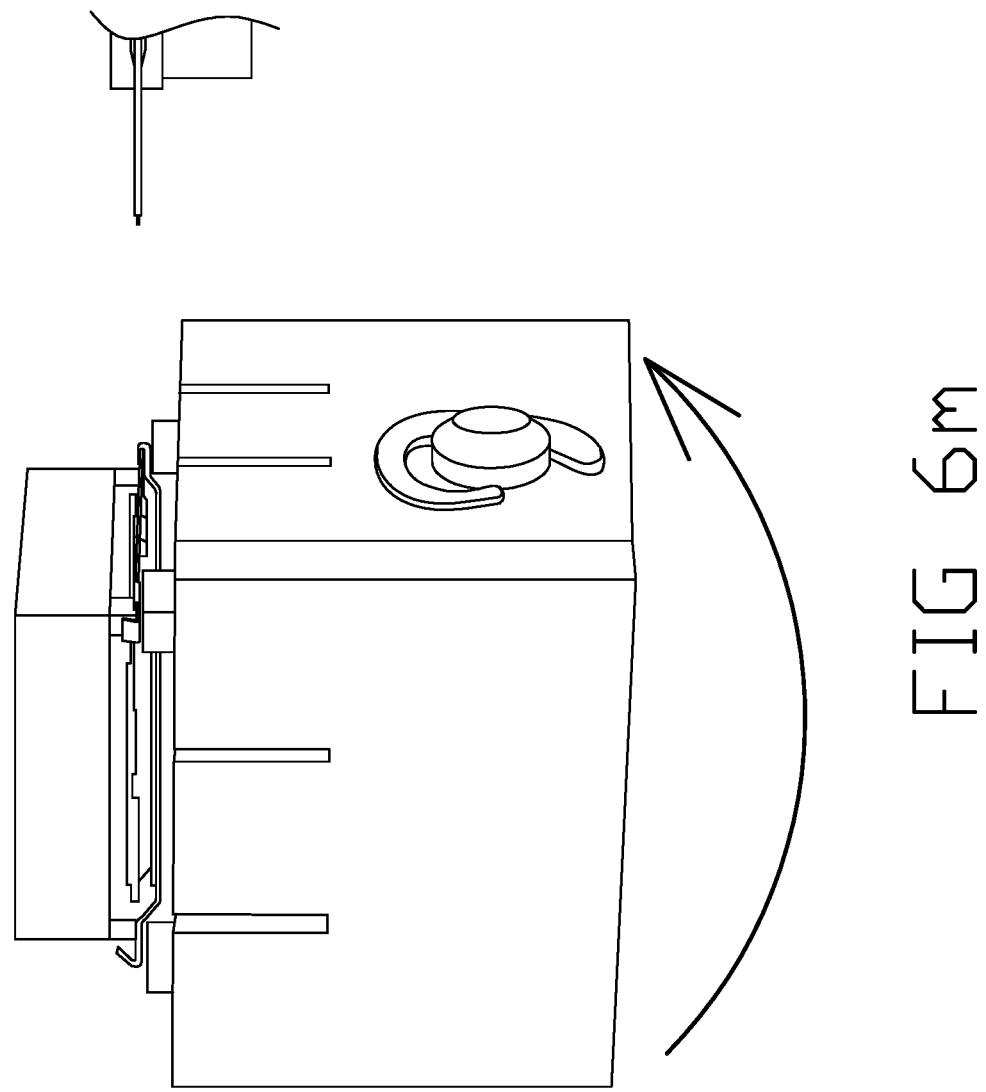
Figure 6N:
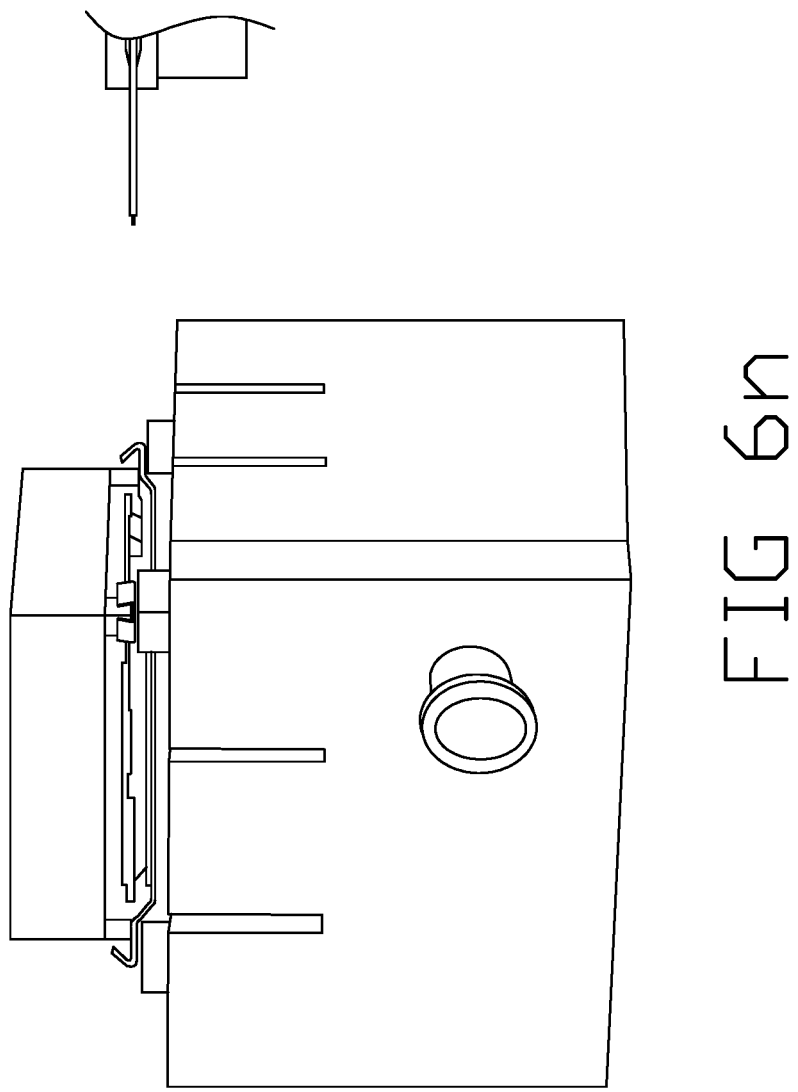

FIGS. 6a-6n illustrate embodiments of the operation of the tool 10. Pedestal 12 and actuator 60 are withdrawn from their operative positions with respect to other components of the tool 10 such as the clamp assembly 16 and the stage 18 to provide access to the pedestal. An unwired component 14 is located on and clamped to the pedestal 12 (e.g., by clamp 100 in the embodiment shown in FIGS. 6a-6n). The pedestal 12 and actuator 60 are then returned to the operative positions at which the sections of wire 32 are attached. During a set-up operation, the wire 32 is fed from the supply 30 to the capillary 24, and a defined amount of wire is exposed beyond the feed opening 28 of the capillary. In other embodiments having a part clamp 102' such as that described in connection with FIG. 7, the pedestal 12 with the component 14 thereon is returned to the operative position in an unclamped state, and the motor 50 is actuated to cause the part clamp to move and engage the component, thereby securing the component onto the pedestal. In these embodiments the part clamp 102' remains engaged with the component 14 throughout the wire feeding and attaching process described below, and following the completion of the process the motor 50 is actuated to retract the part clamp from the component before the pedestal and wired part are moved from the operative position to the withdrawn position.

FIG. 6a shows the pedestal 12 at a first position and orientation, with a first side of the component 14 having two unformed crimps 74 and 76, and the wire clamp assembly 16 at a first or home position with an end of the wire 32 extending from the feed opening 28 of the capillary 24 in a spaced-apart position from the crimps. With the wire 32 clamped with respect to the wire clamp assembly 16 by wire clamp 36, and as shown in FIGS. 6b and 6c, the wire clamp assembly 16 is driven with respect to the component 14 from the position shown in FIG. 6a to a position where the capillary 24 presents the end of the wire 32 within the crimp 76. In embodiments, the wire supply motor is actuated during this motion of the clamp assembly 16 to pay out wire from the source 30 while maintaining a desired tension on the wire 32 between the source and wire clamp 36. The first crimping punch 40 is then actuated to deform the crimp 76 and cause the crimp to engage and attach the wire 32 as shown in FIGS. 6d and 6e.

After the wire 32 is attached to the crimp 76, the wire clamp 36 is actuated to release the wire 32, and the wire clamp assembly 16 is driven with respect to the crimp 76 to expose the wire from the capillary 24 and to feed the wire along the wire feed path as shown in FIGS. 6f and 6g (e.g., such as path 82 shown in FIG. 5), and position the wire within the crimp 74. The amount of wire 32 exposed during this feed operation is determined by the spacing between crimps 74 and 76, and any amount of extra slack or "buckle" desired in the section of the wire between the crimps. The wire clamp 36 is then actuated to clamp the wire 32, and the wire clamp assembly 16 is actuated to move the capillary 24 back toward the crimp 76 to push the desired amount of slack into the wire between the crimps 76 and 74. During this operation, the engagement between the capillary 24 and wire 32 helps ensure that the desired slack is located between the crimps 76 and 74 (i.e., rather than being located between the wire clamp 36 and the proximal end of the capillary). After the wire 32 is properly located and tensioned in the open crimp 74 by the procedure described above, the second crimping punch 41 is actuated to deform the crimp 74 and cause the crimp 74 to engage and attach the wire 32 as shown in FIG. 6h.

With the wire attached to both crimps 76 and 74, the wire clamp 36 is actuated to release the wire 32. The wire clamp assembly 16 is then driven away from the crimp 74 by a distance that is sufficient to enable the wire 32 to be cut, and to pay out of the capillary 24 the desired length of wire to be located in the first crimp on the next side of the component 14. Wire clamp 36 is then actuated to clamp the wire 32 to the wire clamp assembly 16, followed by actuation of the cutting tool 44 to cut the wire between the crimp 74 and the feed opening 28 as shown in FIG. 6i. The appropriate amount of exposed wire for the next attaching sequence then extends from the feed opening 28. Punches 40 and 41 and cutting tool 44 are then retracted in the illustrated embodiment as shown in FIGS. 6j and 6k, and the wire clamp assembly 16 is actuated and returned to its home position shown in FIG. 6l. In other embodiments, a sufficient length of wire 32 to enable the wire to be cut is payed out or fed during the wire pay-out and feeding steps described in connection with FIGS. 6f and 6g. Steps including (1) actuating the wire clamp 36 to release the wire 32, (2) driving the wire clamp assembly 16 away from the crimp 74 to provide the additional and desired length wire to enable the cutting step, and (3) actuating the wire clamp to clamp the wire, as described above in connection with FIG. 6i, can be eliminated by this approach to improve the wiring assembly cycle time.

After the section of wire 32 is attached to the crimps 74 and 76 on a first side of the component 14, actuator 60 is actuated to rotate the pedestal 12 (e.g., 90°) and locate another (e.g., second) side of the component 14 having crimps 74 and 76 with respect to the wire clamp assembly 16 as indicated by FIGS. 6m and 6n. The process described and illustrated with respect to FIGS. 6a-6l is then repeated to attach a second section of wire 32 to the crimps 74 and 76 on the second side of the component 14. The process described and illustrated above is then repeated to attach sections of the wire 32 to the crimps 74 and 76 on the third and fourth sides of the component 14. The pedestal 12 and actuator 60 are withdrawn from their operative positions with respect to the clamping assembly 36 and stage 18, and the component 14 with the attached sections of wire 32 can be removed from the pedestal 12. The process described and illustrated above can then be repeated with another component 14.

FIG. 8 is an illustration of a capillary inspection system 150 that can be used with tool 10. As shown, inspection system 150 includes one or more imaging devices such as cameras 152 coupled to an image processor 154. Image processor 154 can be hardware and/or software based, and can be included in control system 66. Capillaries such as 24 can be delicate tooling components and may be damaged during operation of tool 10 (e.g., by operator handling). The capillaries 24 are also subject to manufacturing tolerances. Inspection system 150 can be used to identify damaged, misaligned or otherwise out-of-tolerance capillaries 24. During a tool set-up procedure, a rigid and precise fixture (not shown) that replicates the shape, tolerances and other characteristics and features of a desired capillary 24 is mounted to the wire clamp assembly 16. The capillary set-up fixture is imaged by the cameras 152, and the images are received by the image processor 154 and used by the image processor as a reference framework. After the reference framework is established, the capillary set-up fixture is removed and a capillary 24 is positioned in the wire clamp assembly 16. Prior to operation of the tool 10 following the installation of the capillary 24, and/or periodically during operation of the tool, images of the capillary (also produced by the cameras 152) are processed and evaluated by processor 154 (e.g., compared to the reference framework). If capillary variations of a type and/or degree within a predetermined threshold are identified (e.g., if the position of the feed opening 28 is slightly misaligned or misplaced from a desired position), control system 66 can compensate for the variations during the wire attaching process. If identified capillary variations are of a type and/or amount greater than a predetermined threshold, the image processor or control system 66 can issue an alert to an operator. The operator can then take appropriate action.

The wire bonding tool and associated method offer a number of important advantages. Wire such as the SMA wire attached to OIS components is relatively fragile and susceptible to damage (e.g., when bonding the wire onto the components). Supporting the wire in a capillary during bonding and other processes using the wire can prevent, minimize or at least reduce damage to the wire. By way of non-limiting example, in some embodiments nitinol wire 32 attached to OIS components such as 14 is about 27-29 μm in diameter (including an outer coating). In these embodiments the use of a capillary 24 of stainless steel and having an inner diameter of about 38 μm has been determined to provide advantages of the type described above. Other embodiments use capillaries and wire having other dimensions. The capillary 24 can also be formed from other materials, such as polymers. Dispensing wire from the capillary coaxially, or at a relatively small angle with respect to coaxially, reduces damage to the wire while allowing the wire to be manipulated. In addition to enhancing the efficiency of the wire attach process, the tool enables the speed and therefore volume of the attach process to be increased.

Although the invention has been described with reference to preferred embodiments, those skilled in the art will recognize that changes can be made in form and detail without departing from the spirit and scope of the invention.

For example, in other embodiments, one or more wire sections can be attached to the component by different wiring/assembly tools (e.g., at different stations, as an alternative to rotating the component with respect to a single attachment tool). Each such wiring/assembly tool can be dedicated to attaching a wire section to one side of the component, and the component can be transported between the tools. The methods by which the wire sections are attached at such different tools can be the same or similar to the methods described above.

Different wire feeding, clamping and/or tensioning structures can be implemented. For example, clamp 36 can be actuated by piezo electric or micro-motor actuators for enhanced speed. In embodiments described in connection with FIG. 1, the wire tension provided by the tensioning mechanism is maintained primarily and throughout the wiring process with respect to portions of the wire that are secured or fixed by a clamp assembly, crimp or other attachment structure. The securing or fixation function is periodically switched between the clamp assembly and the crimp. During situations when the wire is not sufficiently retained by a crimp and the clamp opens, the wire tension can cause the wire to unthread through and from the capillary (i.e., in a direction opposite and away from the feed opening). "Dropped wire" events of this type can cause tool downtime while the wire is re-threaded into the capillary and associated set-up procedures are completed. Embodiments of the invention incorporate wire retention mechanisms that reduce the opportunities for such dropped wire events. For example, embodiments include slip clutch, rollers and/or other mechanisms that do not completely release the wire. One such mechanism can allow the wire to slip in one direction (i.e., the feed direction), but not the other, by closely controlling slip tension thresholds. Another mechanism uses roller contacts to retain the wire, and targeted slip clutch settings to selectively control wire slip. Embodiments using driven rollers (e.g., with motors coupled to the control system) to pay out the wire would have certain advantages. The same rollers can be used to simplify the initial set-up by automating the capillary threading process, purging any potentially damaged wire and synchronizing positions of uncoated wire regions. Certain steps in the wire attach process may be more efficiently performed by paying out additional wire instead of the unclamp/translate/reclamp/translate process of embodiments described in connection with FIG. 1.

Wire feeding by the embodiments described in connection with FIG. 1 is done by moving the clamp assembly (and capillary) about x, y, z and θ axes (e.g., four degrees of freedom) with respect to a relatively fixed component (other than rotation of the component by the actuated pedestal to present different sides of the component). The same or similar relative wire feeding (e.g., wire feed paths) can be achieved by providing some or all of the degrees of freedom movement through movement of the component. For example, in embodiments, the tool is configured with a clamp assembly that translates about x and y axes, and a pedestal that this driven by an actuator in z and θ axes. Wire feeding paths such as those described above can be achieved by different combinations of motion of the clamp assembly and component (e.g., the pedestal, instead of the clamp assembly, can be driven through relatively small ranges of motion about the z and θ axes).

The invention claimed is:

1. A wire feeding and bonding tool, comprising:
   a support configured to hold a component to which a wire is to be attached, the component has at least first and second spaced-apart wire attach structures to which the wire can be attached, and a first wire axis extends between the first and second wire attach structures; and
   a wire clamp assembly adjacent to the support, the wire clamp assembly including:
      a capillary having an end portion with a feed opening and configured to receive a wire that extends from the feed opening;
      a stage for moving the capillary with respect to the support to position the capillary and the wire extending from the feed opening;
      an attachment component adjacent to the support and configured to attach the wire to the first and second wire attach structures; and
      a controller electrically coupled to the stage and the attachment tool, wherein the controller is configured to cause the stage to actuate to position the capillary with portions of the wire extending from the feed opening along a wire feed path and feed the wire from the first wire attach structure to the second wire attach structure with the wire emerging from the feed opening coaxially with the wire axis; and
      wherein the controller is also configured to actuate the attachment component to attach the wire to the first and second attach structures.

2. The wire feeding and bonding tool of claim 1, wherein the component has at least one bonding area, and
   the controller is configured to cause the stage to actuate to position the capillary with portions of the wire extending from the feed opening extending into the bonding areas; and
   the attachment component includes at least one soldering tool to attach the wire to the first and second wire attach structures.

3. The wire feeding and bonding tool of claim 1, wherein the component has at least one bonding area, and
   the controller is configured to cause the stage to actuate to position the capillary with portions of the wire extending from the feed opening extending into the bonding areas; and
   the attachment component includes at least one welding tool to attach the wire to the first and second wire attach structures.

4. The wire feeding and bonding tool of claim 1, wherein the component has at least one bonding area, and
   the controller is configured to cause the stage to actuate to position the capillary with portions of the wire extending from the feed opening extending into the bonding areas; and
   the attachment component includes at least one conductive adhesive dispensing tool to attach the wire to the first and second wire attach structures.

5. The wire feeding and bonding tool of claim 1, wherein:
   the capillary includes a linear end portion; and
   the controller is configured to the stage to actuate to move the capillary with the linear end portion coaxially with the wire axis to reduce damage to the wire.

6. The wire feeding and bonding tool of claim 1, wherein:
   the controller is configured to cause the stage to actuate to move the capillary away from the first wire attach structure along a first portion of the wire feed path that is generally linear; and
   the controller is configured to cause the stage to actuate to move the capillary during a second portion of the wire feed path that is generally perpendicular to the first portion of the wire feed path, and the second portion of the wire feed path is shorter than the first portion of the wire feed path.

7. The wire feeding and bonding tool of claim 6, wherein the controller is configured to actuate the stage to move the capillary through a looping path during the second portion of the wire feed path.

8. The wire feeding and bonding tool of claim 1 comprising a cutting tool positioned with respect to the support to cut the wire and the controller is configured to cause the cutting tool to actuate to cut the wire.

9. The wire feeding and bonding tool of claim 8, wherein the controller is configured to:
   cause the stage to actuate to position the capillary with an end of the wire extending from the feed opening adjacent to the first wire attach structure;
   cause the attachment component to actuate to attach the end of the wire adjacent to the first wire attach structure to the first wire attach structure;
   cause the stage to actuate to move the capillary along the wire feed path after the wire is attached to the first attach structure, and to position a portion of the wire extending from the capillary adjacent to the second wire attach structure;
   cause the attachment component to actuate to attach the portion of the wire adjacent to the second wire attach structure to the second wire attach structure; and
   cause the cutting tool to actuate to cut the portion of the wire attached to the second attach structure from a portion extending from the feed opening.

10. The wire feeding and bonding tool of claim 9 wherein the component has first and second attach structures, each with a bonding area, and the controller is configured to cause the stage to actuate to position the capillary with the wire extending from the feed opening into the bonding areas; and
    the attachment component includes at least one soldering tool to attach the wires within bonding areas of the first and second attach structures.

11. The wire feeding and bonding tool of claim 9, wherein the component has first and second attach structures, each with a bonding area, and
    the controller is configured to cause the stage to actuate to position the capillary with the wire extending from the feed opening into the bonding areas; and
    the attachment component includes at least one welding tool to attach the wires within bonding areas of the first and second attach structures.

12. The wire feeding and bonding tool of claim 9, wherein the component has first and second attach structures, each with a bonding area, and
    the controller is configured to cause the stage to actuate to position the capillary with the wire extending from the feed opening into the bonding areas; and
    the attachment component includes at least one conductive adhesive dispensing tool to attach the wires within the bonding areas of the first and second attach structures.

13. The wire feeding and bonding tool of claim 9, wherein the component has at least third and fourth wire attach structures, each with a bonding area, and wherein a second wire attach axis that is non-collinear with the first wire attach axis extends between the third and fourth bonding areas, and the wire feeding and bonding tool includes a support actuator coupled to the controller to rotate the support with respect to the wire feed system; and the controller is configured to:

cause the support actuator to actuate to rotate the support and component held thereon;

cause the stage to actuate to position the capillary with an end of the wire extending from the feed opening into to the third bonding area;

cause the attachment component to actuate to attach the wire to the third bonding area;

cause the stage to actuate to move the capillary along the wire feed path after the wire is attached to the third bonding area, and to position a portion of the wire extending from the capillary into the fourth bonding area;

cause the attachment component to actuate to attach the wire to the fourth bonding area; and cause the cutting tool to actuate to cut the portion of the wire attached to the fourth bonding area from a portion extending from the feed opening.

14. The wire feeding and bonding tool of claim 13, wherein:

the controller is configured cause the stage to actuate to move the capillary away from the first wire attach structure along a first portion of the wire feed path that is generally linear;

the controller is configured to cause the stage to actuate to move the capillary during a second portion of the wire feed path that is generally perpendicular to the first portion of the wire feed path to position the wire adjacent to the second wire attach structure, and wherein the second portion of the wire feed path is shorter than the first portion of the wire feed path;

the controller is configured to cause the stage to actuate to move the capillary away from the third wire attach structure along a first portion of the wire feed path that is generally linear; and the controller is configured to cause the stage to actuate to move the capillary during a second portion of the wire feed path that is generally perpendicular to the first portion of the wire feed path to position the wire adjacent to the fourth wire attach structure, and the second portion of the wire feed path is shorter than the first portion of the wire feed path.

15. The wire feeding and bonding tool of claim 9, comprising a tensioner to tension the wire.

16. The wire feeding and bonding tool of claim 9, wherein:

the capillary includes a linear end portion; and the controller is configured to cause the stage to actuate to move the capillary with the linear end portion sufficiently coaxial with the wire axis to reduce damage to the wire.

17. The wire feeding and bonding tool of claim 1, wherein:

the tool includes a clamp coupled to the control system to releasably fix the position of the wire with respect to the capillary; and the control system is configured to:

cause the stage to actuate to position the capillary with an end of the wire extending from the feed opening adjacent to the first wire attach structure;

cause the attachment component to actuate to attach the end of the wire adjacent to the first wire attach structure to the first wire attach structure;

cause the stage to actuate to move the capillary after the wire is attached to the first attach structure, to feed wire from the capillary and to position a portion of the wire extending from the capillary adjacent to the second wire attach structure;

cause the clamp to actuate to fix the wire with respect to the capillary after the portion of the wire is positioned adjacent to the second wire attach structure;

cause the stage to actuate to move the capillary with the fixed wire toward the second attachment structure to push slack into the wire between the first and second attachment structures; and cause the attachment component to actuate to attach the wire to the second wire attach structure.

18. The wire feeding and bonding tool of claim 1 comprising a monitor to identify locations of uncoated regions on the wire; and the control system is coupled to the monitor and causes the location of the wire with respect to the capillary to be adjusted as a function of the identified locations of the uncoated regions of the wire.

19. The wire feeding and bonding tool of claim 1 comprising a tensioner to apply tension to the wire.

20. The wire feeding and bonding tool of claim 1 comprising a capillary clamp mounted to the stage, to releasably hold the capillary.

* * * * *